No. 769,243. PATENTED SEPT. 6, 1904.
W. O. WORTH.
VEHICLE TIRE AND FASTENER THEREFOR.
APPLICATION FILED OCT. 27, 1902.
NO MODEL.
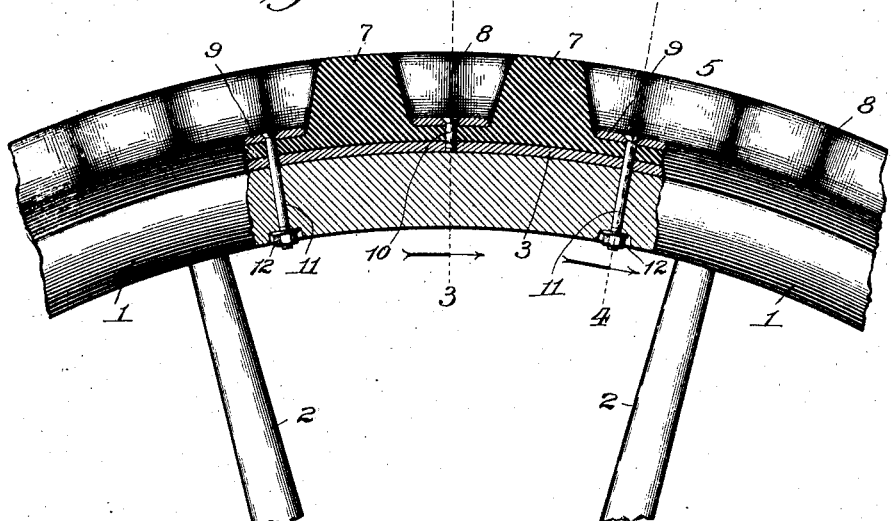
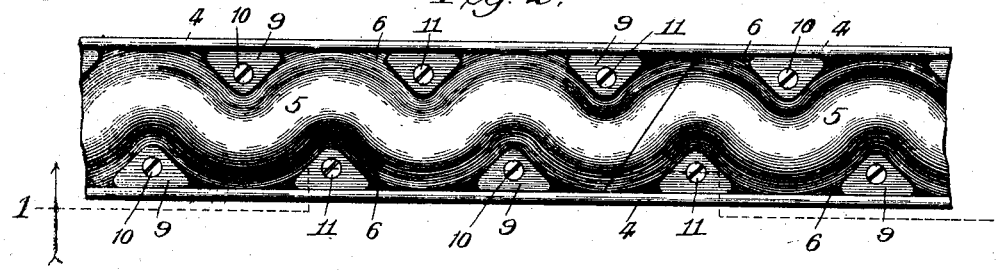
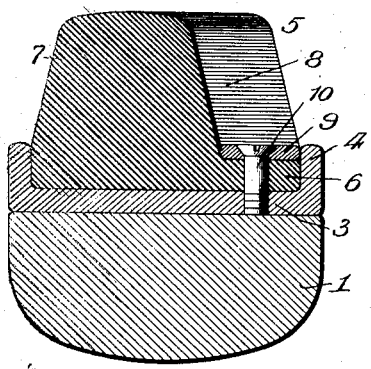
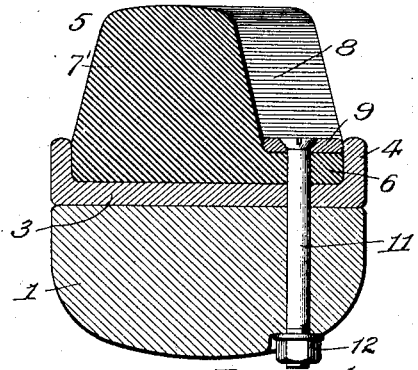
Witnesses:
John Enders Jr.
Geo. C. Dawson
Inventor:
William O. Worth,
By Forée Bain
Att'y No. 769,243. Patented September 6, 1904.

UNITED STATES PATENT OFFICE.

WILLIAM O. WORTH, OF CHICAGO, ILLINOIS.

VEHICLE-TIRE AND FASTENER THEREFOR.

SPECIFICATION forming part of Letters Patent No. 769,243, dated September 6, 1904.

Application filed October 27, 1902. Serial No. 128,898. (No model.)

*To all whom it may concern:*

Be it known that I, WILLIAM O. WORTH, of Chicago, in the county of Cook and State of Illinois, have invented certain new and useful Improvements in Vehicle-Tires and Fasteners Therefor; and I hereby declare that the following is a full, clear, and exact description thereof, reference being had to the accompanying drawings, which form part of this specification.

My invention relates to vehicle-tires and fasteners therefor.

One of the objects of my invention is to provide a resilient vehicle-tire, particularly adapted for use upon motor-vehicles, which will exert a great tractive effect when employed on rough, soft, or slippery road-beds.

A further object of my invention is to provide a tire construction of the character described, which will insure maximum strength thereto in the direction of strain.

A further object of my invention is to provide a novel fastening means for securing the tire parts together and to the vehicle-wheel.

A further object of my invention is to provide improved reinforcing means coöperating with the fastening means to strengthen the tire structure.

With a view to attaining these and other objects, which will become apparent to those skilled in the art from the following description, my invention consists in the features of construction and arrangement hereinafter described, and specified in the claims.

In the drawings, Figure 1 represents a fragment of a vehicle-wheel, partly in section, illustrating the preferred application of my improved tire and fastening thereto. Fig. 2 is an isometric plan view of a fragment of a tire. Fig. 3 is a vertical transverse section on line 3 3 of Fig. 1. Fig. 4 is a similar view on line 4 4 of Fig. 1.

In the drawings, 1 represents the felly of a vehicle-wheel, and 2 2 spokes thereof.

3 indicates a metallic channel-rim adapted to be secured to the felly and provided at its exterior edges with outwardly-projecting flanges 4 4, adapted to embrace the base of the tire when in place thereon.

The tire proper (indicated as a whole by the numeral 5) is preferably composed of rubber or of some other suitable resilient substance. It comprises as an integral structure a relatively wide base portion 6 of such width as to snugly fit between the flanges 4 of the channel-rim and an elevated relatively narrow continuous tread 7. The base 6 of the tire 5 is preferably thin, its vertical dimensions being somewhat less than the height of the flanges 4 of the channel-rim. The tread portion 7 is relatively thick and is preferably tapered from its base to its exterior periphery or tread proper. The tread portion 7 is preferably of substantially uniform width and is disposed upon the base in successively-reversed obliquely-angular relation to the median circumference of the tire—that is to say, its median line is alternately deflected from the median circumferential line of the tire in opposite directions to form a continuous series of alternating angles or undulations, the combined width of which equals the width of the base. The parts are so proportioned that the inner angle of each deflection of the tread-surface lies in approximately the median circumferential line of the tire, so that said median line will when the tire is in place form a complete unbroken circle. The effect of this undulatory or angular disposition of the tread portion of the tire is to leave small triangular recesses 8 in the edges of the tire, said recesses alternating in position upon opposite sides of the tread portion.

9 9 indicate triangular reinforcing-plates, of metal or other suitable material, arranged to fit snugly within the recesses in the sides of the tire, each bearing on one face against flange 4 of the channel-rim and upon its opposite faces against the side faces of its recess 8 in the tread portion of the tire. 10 10 indicate screw-bolts taking through said plates and the tire-base 6 and threaded into apertures in the base of the channel-rim 3. Such screws are preferably countersunk in the plates 9 to lie flush therewith.

11 11 indicate elongated bolts employed in conjunction with certain of the plates 9 and taking through said plates, the tire-base, channel-rim, and wheel-felly to secure all of said parts together. Said bolts are screw-threaded at their ends for the reception of nuts 12, and their heads are preferably countersunk in the plates 9. Only enough of the long bolts 11 are employed to properly secure the rim and tires to the felly, the remaining plates 9 being secured to the rim and tire by the shorter bolts 10.

The tire proper, 5, may be made in a single piece or in any suitable number of sections. In any case where joints in the tire structure occur I prefer that the line of separation should be substantially parallel to a line connecting the centers of two plates lying on opposite sides of the tread and approximately midway between two such plates on the same side of the tread, so that the separated ends of the tire may be most efficiently held.

The effect of the structure herein described is primarily to increase the tractive effect of the tire when employed upon soft or slippery road-beds. If the tire sinks to any material extent in the road-bed, the recesses in the sides of the tire are more or less filled with the sustaining material and the tire-wheel is prevented from slipping by the engagement of the angular or undulatory tread portion with the road. When power is applied to rotate the wheel—as, for instance, when a tire is used upon a motor-vehicle—the angularity of the surface presented for contact with the road-bed tends to force the material with which it contacts laterally out of the recesses 8 in the edge of the tire. The resistance of this lateral movement of the road-bed material and the adhesion of such material to the surface presented greatly increases the tractive effect of the tire beyond that incident to the use of a straight tire.

It will be noted that the continuous nature of the tread portion and its disposition so as to afford a solid unbroken median area imparts great strength to the tire structure in the direction of strain. The strength of the tire is further greatly increased by the employment of the triangular plates 9, which afford rigid abutment for the sides of each deflected portion of the tread and prevents them from tearing or breaking when under strain. Further, it will be noted that the fastening means herein described affords a very convenient method for attaching and detaching the tire, as the entire tire structure, including the rim and tire proper, may be detached from the felly without separating such rim 3 and tire 5.

While I have herein described in detail a tire constructed in accordance with my invention, it is apparent that slight changes in construction and arrangement of parts might be made without departing from the spirit and scope of my invention.

Having described my invention, what I claim as new, and desire to secure by Letters Patent of the United States, is—

1. A wheel-tire comprising a base and an elevated integral portion disposed upon the base to constitute a tread of laterally-undulating form, the median line of each undulation whereof is obliquely arranged relative to the median line of the base.

2. In combination with a wheel-felly, a tire comprising a base portion, and an elevated tread portion of less width than the base portion disposed thereon in a continuous series of lateral undulations, each undulation whereof crosses the median line of the base at an oblique angle, and means for securing the tire to the felly engaging the base in the recesses left by the tread undulations.

3. In combination with a wheel-felly, a tire comprising a base and an integral elevated tread portion, formed in a series of successively-reversed angles, the sides of each angle whereof are obliquely arranged relative to the median line of the tire, to provide a series of triangular recesses in the edge of the tire, and bolts taking through the tire-base disposed in said recesses and securing the tire to the felly.

4. In combination with a circular supporting structure, a tire comprising in an integral structure a relatively wide base, and an elevated tread portion of less width than the base disposed thereon to form a continuous series of angular lateral undulations, each undulation whereof crosses the median line of the base at an oblique angle thereto, to provide a series of triangular recesses in each edge of the tire, triangular reinforcing-plates seated upon the base within said recesses, and means arranged to secure said plates to the supporting structure.

5. A wheel-tire comprising a flat base and a tread provided along its opposite edges with triangular recesses having their sides disposed in reverse, obliquely-angular arrangement relative to the median line of the base, and extending down to the base.

6. A wheel-tire comprising a flat base, and a tread provided along its opposite edges with triangular recesses having their sides disposed in reverse obliquely-angular arrangement relative to the median line of the base, and extending down to the base, said recesses being alternately arranged on opposite sides of the tire.

7. A wheel-tire comprising a flat base and a tread provided with recesses formed in the edges thereof, the sides of said recesses being disposed in relatively reverse, obliquely-angular arrangement relative to the median line of the tire, and bolts arranged in said recesses taking through the base and into the felly to secure the tire upon the felly.

8. In a vehicle-tire, a channel-rim having outwardly-extending flanges at the edges thereof, a tire proper comprising a relatively wide base adapted to fit snugly between said flanges, and of a thickness less than the height of said flanges, and a relatively narrow tread portion formed integral with said base and disposed in successively-reversed obliquely-angular relation to the median circumference of the tire, to provide angular recesses in each edge thereof, triangular reinforcing-plates arranged to fit in said recesses to bear against the sides thereof and against the adjacent flange of the rim, and bolts for securing said plates to the rim-base.

9. In a vehicle-wheel, the combination with a felly of a channel-rim having outwardly-extending flanges at its edges, a tire proper comprising in an integral structure a relatively wide base of a thickness less than the height of said flanges, arranged to fit snugly therebetween, and a relatively narrow tread portion disposed in successively-reversed obliquely-angular relation to the median circumference of the tire, to provide angular recesses in the edge thereof, triangular plates seated upon the tire-base in such recesses to bear against the sides thereof and against the adjacent rim-flange, and bolts taking through said plates, tire-base, rim and felly to secure said parts together.

In testimony that I claim the foregoing as my own I affix my signature in presence of two witnesses.

WILLIAM O. WORTH.

In presence of—
FORÉE BAIN,
MARY F. ALLEN.